United States Patent

[11] 3,591,890

[72] Inventors Arnold P. Le Vasseur
Lakeville;
Randolph P. Roen, St. Paul, both of, Minn.
[21] Appl. No. 726,184
[22] Filed May 2, 1968
[45] Patented July 13, 1971
[73] Assignee Minnesota Mining and Manufacturing Company
St. Paul, Minn.

[54] APPARATUS FOR HEAT SHRINKING TUBING ABOUT OBJECTS
9 Claims, 19 Drawing Figs.
[52] U.S. Cl. ..................................................... 18/4 R, 18/5 E
[51] Int. Cl. ................................................... B29c 17/00, B29c 27/00
[50] Field of Search .......................................... 18/5 E, 4 V, 20 C, 20 P; 264/297, 230

[56] References Cited
UNITED STATES PATENTS
| | | | |
|---|---|---|---|
| 2,282,328 | 5/1942 | Herrick et al. | 18/5 (E) X |
| 2,419,484 | 4/1947 | Danziger | 18/5 (E UX) |
| 3,005,539 | 10/1961 | Wellington | 18/5 (E) X |
| 3,012,273 | 12/1961 | Lewis | 18/5 (E) X |
| 3,382,533 | 5/1968 | Fyfe et al. | 18/5 (E) |

Primary Examiner—J. Spencer Overholser
Assistant Examiner—Michael O. Sutton
Attorney—Kinney, Alexander, Sell, Steldt & Delahunt ABSTRACT: A process is taught for fixing shrinkable tubing about objects. The process includes cutting a section from an advanced end of shrinkable tubing, conveying the discrete section sequentially and in spaced and oriented condition to an object-receiving station, inserting an object therein, and shrinking the tube section about the object. Tube section encompassed objects formed by this process are also taught.

Apparatus arrangements are also set forth; and these include an indexing holder assembly of tube section holders, an indexing body assembly of mandrels adapted to receive cut sections of shrinkable tubing and transfer them into tube section holders of the holder assembly, an indexing selector feed mechanism for conveyance of objects into position for insertion into tube sections hold by the indexing holder assembly, plus means to shrink sections of tubing about objects therein, ;and then means to eject tube-encompassed objects from the indexing holder assembly.

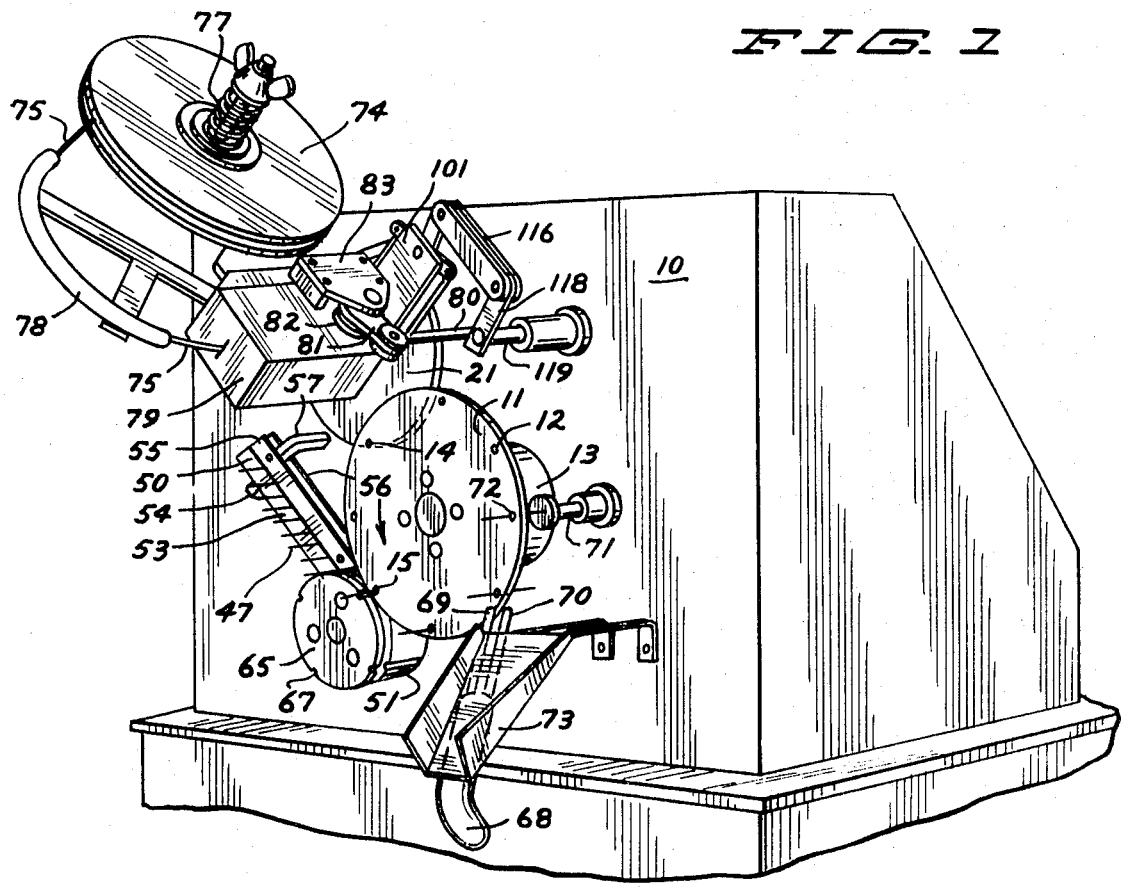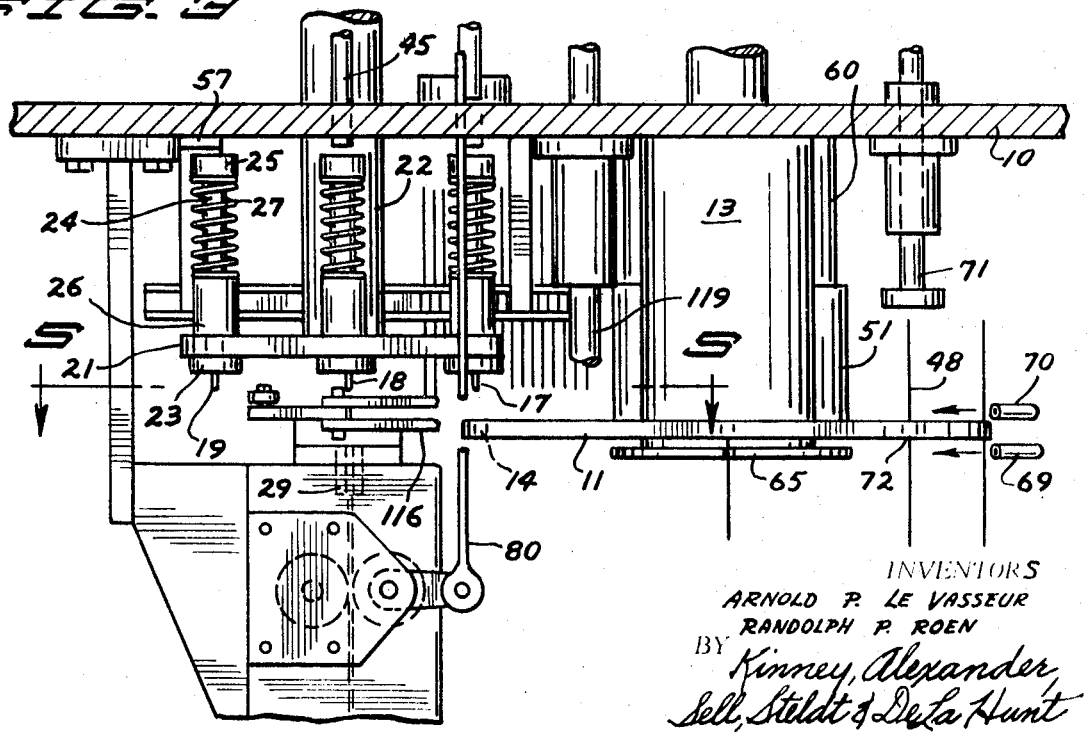

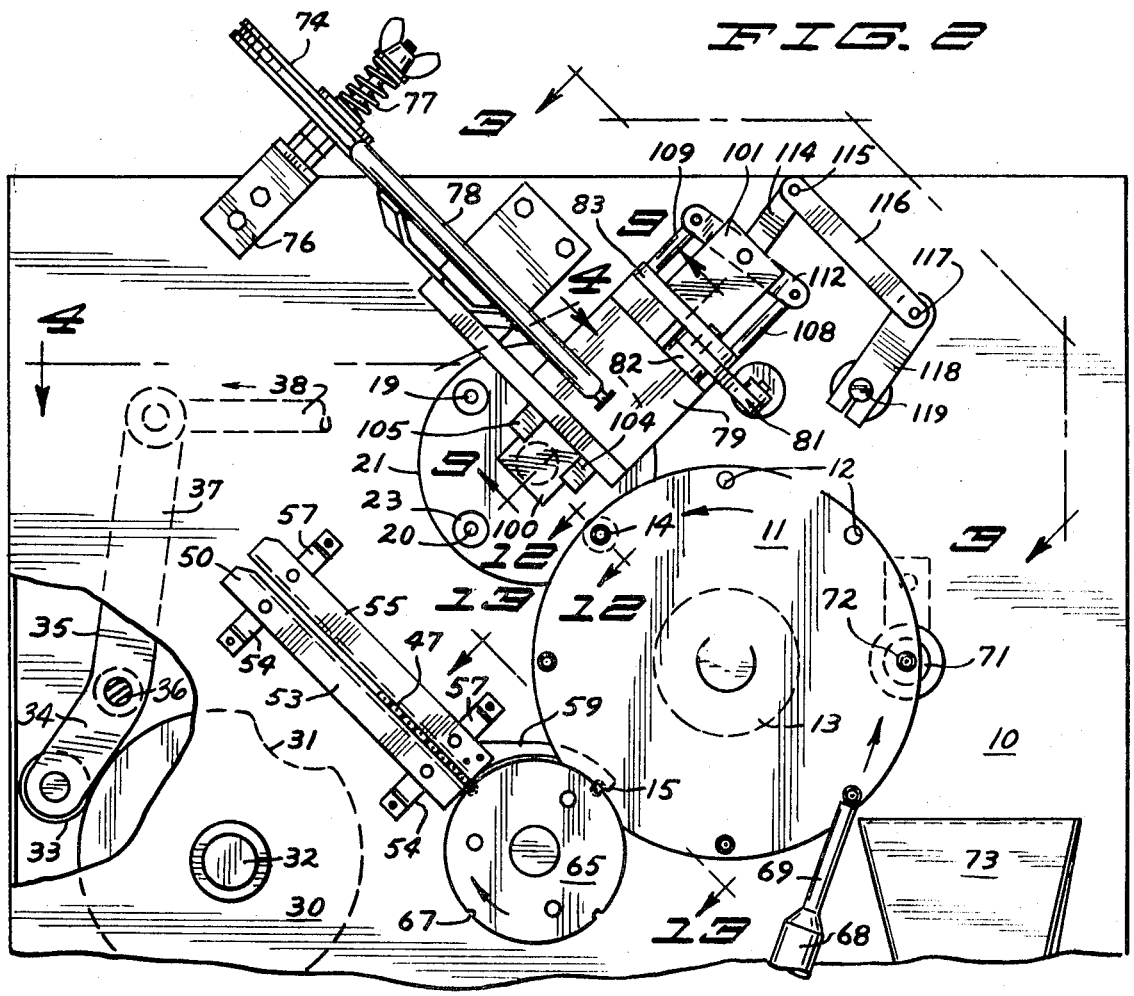
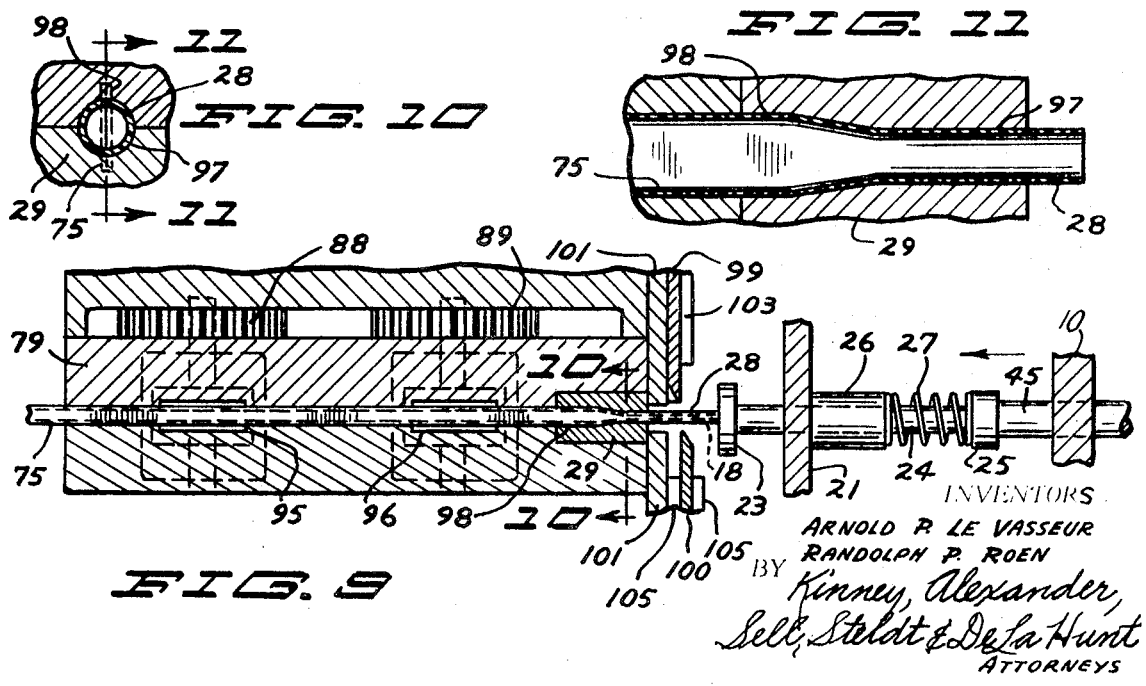

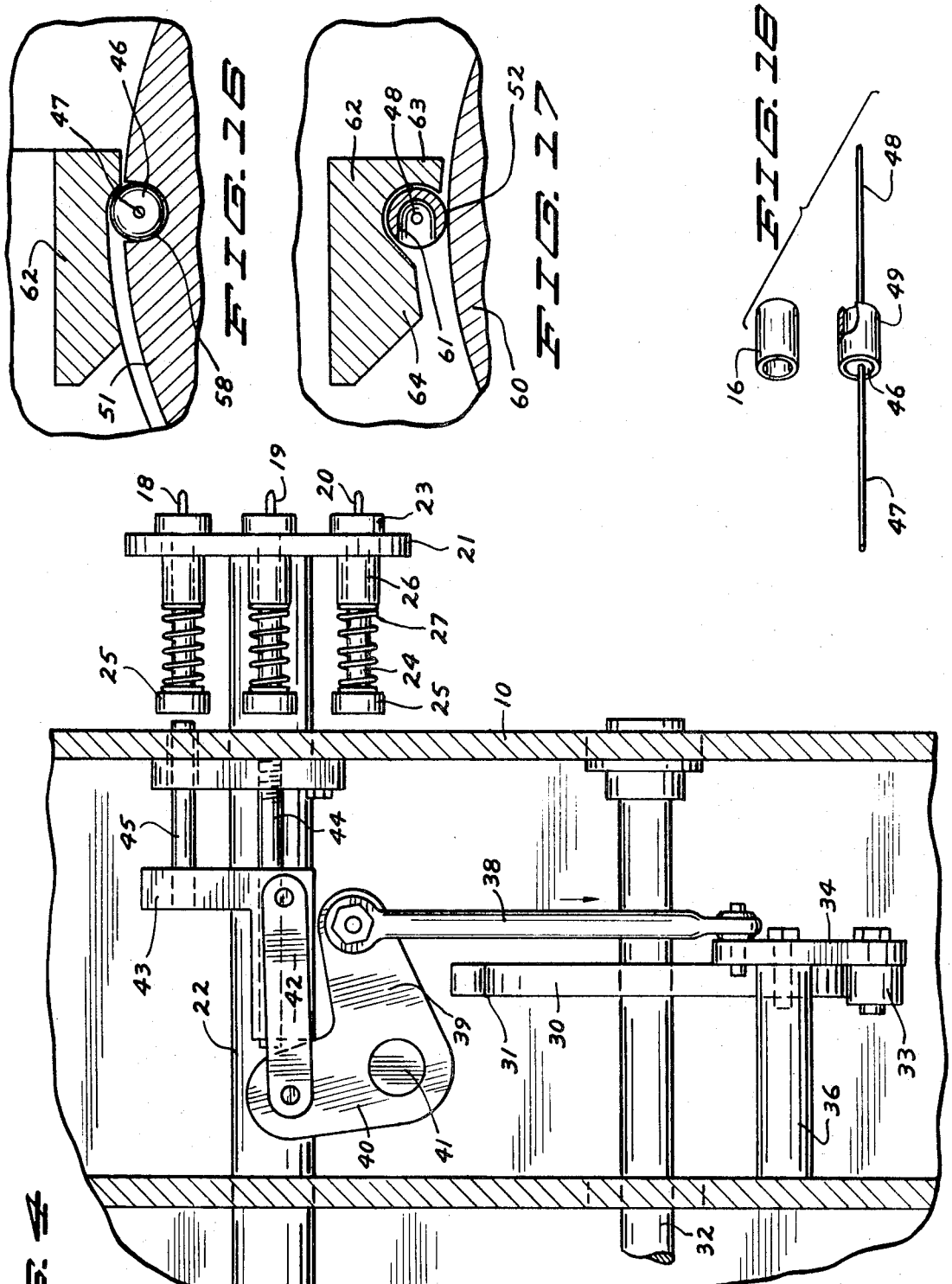

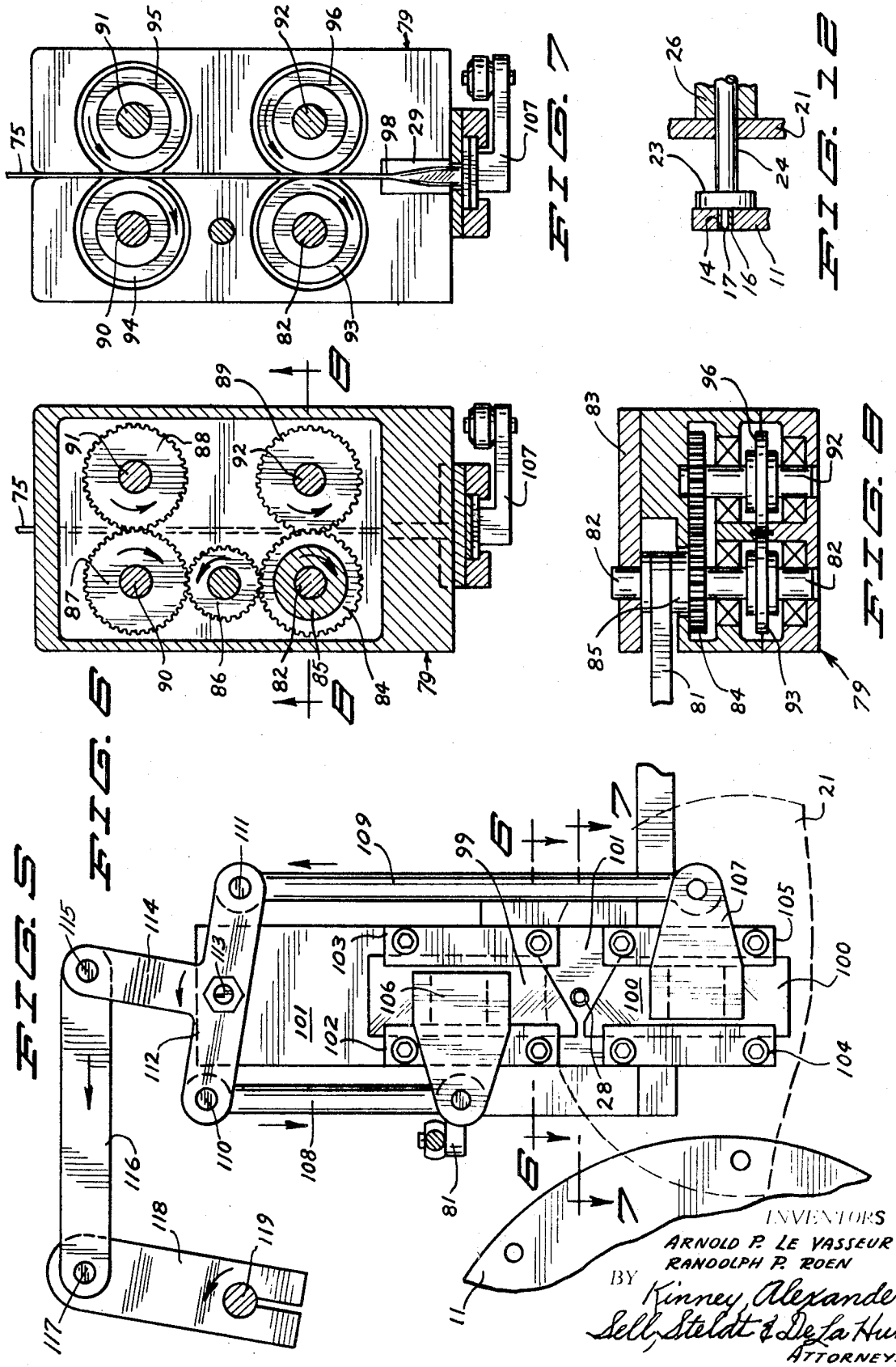

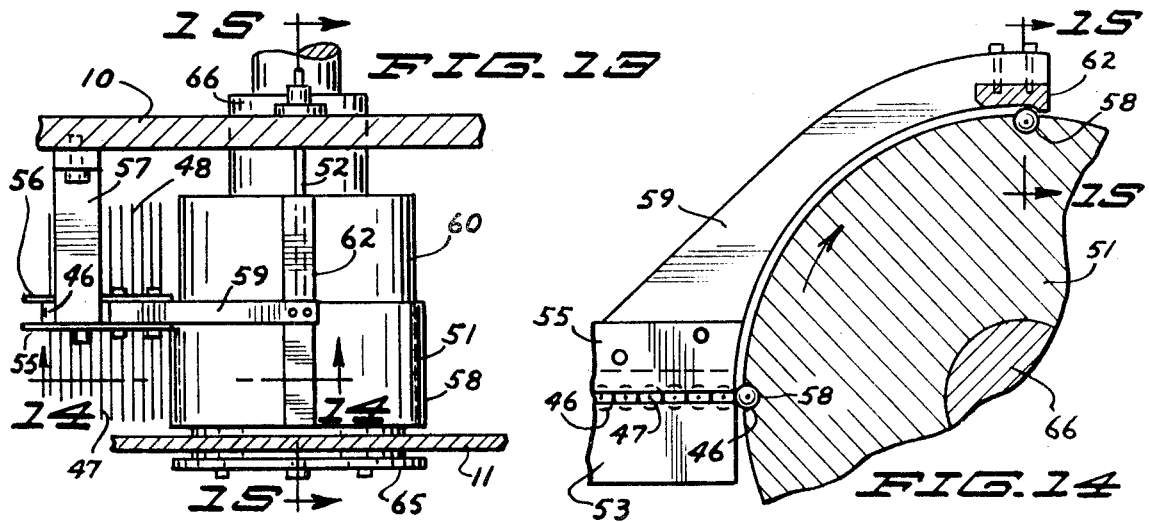
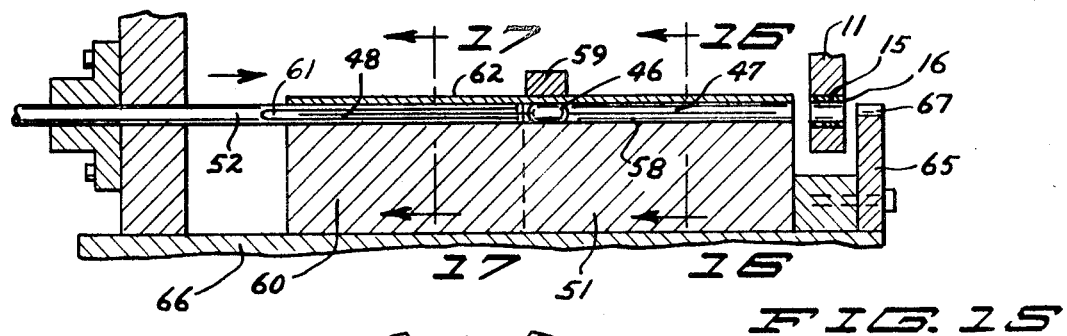
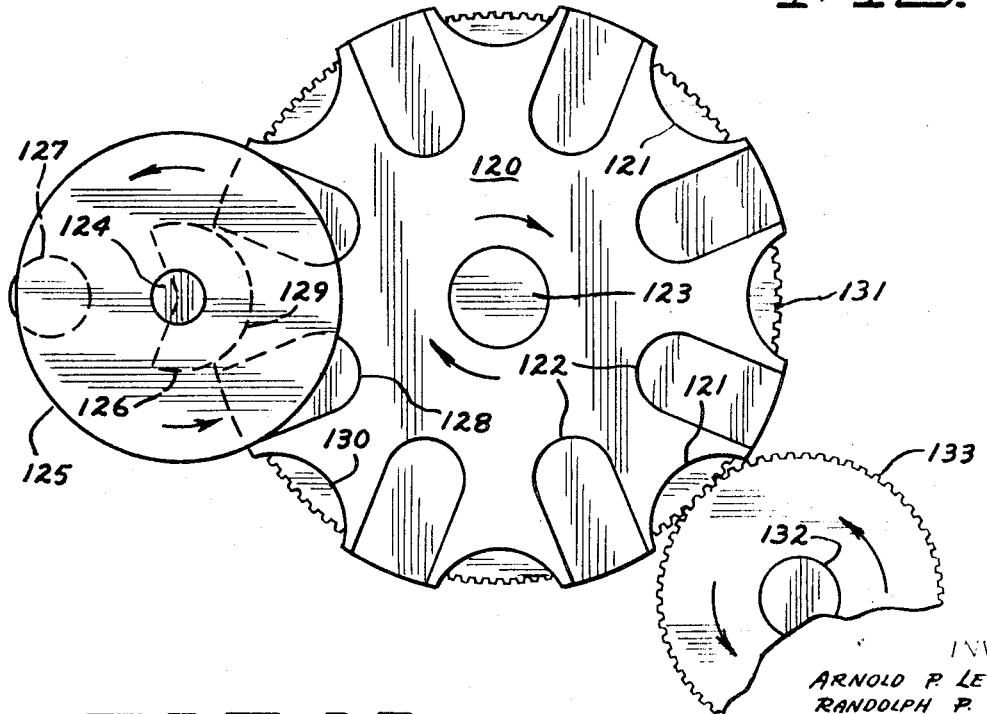

APPARATUS FOR HEAT SHRINKING TUBING ABOUT OBJECTS

This invention relates to a new method for fixing sections of shrinkable tubing about objects, to objects formed by the method, and to new apparatus arrangements for affixing sections of shrinkable tubing about objects.

In preferred embodiments of the invention, shrinkable tubing of long tapelike length, preferably flattened and convoluted upon itself in a supply roll, is employed as the starting tubular material.

The invention is useful in the preparation of articles having tube-encompassed objects or parts, and is especially useful in the preparation of articles having an object or part encompassed by a section of tubing as well as a part thereof maintained free of the tubing. Thus, the invention finds particular application in the preparation of tube-encompassed capacitors, transistors, resistors and other electric or electronic-type objects having electrical leads or other parts which are normally maintained free of covering by the tubing. It will be recognized, however, that the invention is also useful in the preparation of tube-encompassed objects or articles which contain no critical part to be kept free of a tube covering.

Shrinkable tubing useful in the practice of the invention may have any suitable combination of properties in addition to the required flexibility and shrinkability for the operations hereinafter discussed. It may or may not be electrically insulating. It may be opaque or transparent or translucent. It may be colored or exhibit a color hue. It may upon shrinking either be altered in its properties or retain certain of its characteristics such as transparency or insulation value or the like. Upon shrinking, it may or may not cure or become relatively rigid or brittle, depending upon the specific material out of which the shrinkable tubing was formed. A popular form of shrinkable tubing consists essentially of a polyethylene terephthalate in stretched condition and therefore in a condition to shrink (for example, about 5 up to 75 or even 80 shrinkage) upon brief heating to a temperature of, for example, 50° C. or 100° C. or higher. In all cases, the essential feature of the starting material employed as the shrinkable tubing is that it must be sufficiently flexible or nonbrittle to resist cracking under the conditions of treatment to which it is subjected in the method and machine described; and it must fix itself about an object, as by shrinking or constricting, when exposed to mild heat or other fixing environment. The usual tubing employed in the invention may vary from about 1 or 2 millimeters up to about 3 centimeters in diameter, with wall thicknesses varying from a micron or so up to a few millimeters; but smaller and larger diameters and wall thicknesses may be selected for critical applications, if desired.

According to the improved method of this invention, shrinkable tubing is cut from one end of a payout supply length of it into sections of predetermined length for fixing about objects. These cut discrete sections are conveyed sequentially and in spaced and oriented condition to an object-receiving station. At the object-receiving station, an object is inserted in each cut section; and then the tube-section is shrunk about the object therein.

Intermittent advancing of the end of a payout length of shrinkable tubing from which sections of predetermined length are cut is contemplated; and when this preferred approach is employed, the cutting of tube sections is preferably accomplished during pauses between intermittent advances. Further, a flattened tapelike form for the payout length of shrinkable tubing is contemplated as the preferred form for it to be supplied in commerce; and such flattened tubing is opened according to the invention into or toward an object-receiving sleeve cylinder shape for the sections prior to inserting objects therein.

Tube-encompassed objects formed according to the invention are highly uniform in quality; and this is particularly important in some electrical arts, especially where the active electronic part of the article must be fully encompassed by a tube section but its electrical leads maintained free of the same, and not damaged nor crimped.

The new apparatus for accomplishing affixation of sections of shrinkable tubing about objects is conveniently characterized by particular reference to its arrangements of elements in various combinations and subcombinations especially effective to provide the results taught herein.

One such arrangement of elements provides a machine having, in combination:

1. a holder assembly of tube section holders spaced from each other, each of the tube section holders being adapted to hold a section of shrinkable tubing in oriented condition as an open-ended object-receiving sleeve cylinder,
2. means to index the holder assembly in predetermined increments to place at least one of the spaced tube section holders thereof at a first treatment station and simultaneously place at least one other spaced tube section holder of the assembly at a second treatment station and to maintain said tube section holders at the treatment stations during an indexing pause,
3. means to orient a section of the shrinkable tubing in a tube section holder of the holder assembly at the first treatment station during the same indexing pause,
4. means to place an object in an oriented section of the shrinkable tubing at the second treatment station during the same indexing pause, and
5. means to affix object-containing sections of shrinkable tubing about the object therein.

Preferred tube section holders for the holder assembly consist essentially of cylindrical bores in which the sections of shrinkable tubing fit snugly in dislodgment-resistant condition.

Means to orient a section of the shrinkable tubing in a tube section holder at the first treatment station may comprise a mandrel adapted to move into cooperative relationship with the tube section holder to transfer a section of shrinkable tubing from the mandrel to the tube section holder.

A selector mechanism may be provided for selection and orientation of objects preparatory to insertion of them in sections of shrinkable tubing.

Means to affix object-containing sections of shrinkable tubing about objects therein operates subsequent to the second treatment station in the indexing of the holder assembly; and this means effects a greater snugness of fit between the object and section of tubing than between the tube section holder and section of tubing.

An ejection means operates subsequent to the affixing step to remove tube section encompassed objects from tube section holders of the holder assembly prior to indexing of tube section holders into the first treatment station.

The machine preferably includes means to mount a payout length of flexible shrinkable tubing, in flattened tape condition convoluted upon itself in a roll (such as a supply roll), in position for feeding one end of the roll to a mandrel. It may include means to open one end of a flattened supply length toward or into an essentially sleeve cylinder shape as it is fed upon a mandrel. Feeding of a supply length of shrinkable tubing is preferably accomplished by feed rollers which grippingly act upon opposite surfaces of a length of shrinkable tubing. Opening one end of a length of flattened tubing toward a cylindrical configuration is conveniently accomplished by forcing the tubing through a die constriction, preferably located within a distance of about 5 centimeters from the immediately preceding feed rollers. Longer distances may be employed, particularly with larger tubing diameters or wall thicknesses; but the shorter distances are preferred for most flattened tubing. Mandrels are provided which are characterized by having a blunt but sufficiently pointed tip for insertion into an opened end or a partially opened end of flattened tubing exiting from a die.

A combination of machine elements which is especially useful and advantageous where payout lengths of flattened shrinkable tubing are employed as starting material, comprises:

1. means to mount a payout length of shrinkable tubing in flattened condition convoluted upon itself in a roll,
2. means to feed (preferably by intermittent advances) one end of the payout length of shrinkable tubing through a die, the die being of sufficient width at its entrance to receive the shrinkable tubing without restriction, and gradually changing in contour into an approximately cylindrical exit constriction having a diameter less than the flattened width of the shrinkable tubing, whereby the tubing exiting from the die is opened toward cylindrical configuration,
3. a mandrel adapted to receive thereabout the feed end of tubing opened toward a cylindrical configuration, and
4. means to sever a section of shrinkable tubing from the feed end thereof after the feed is on a mandrel.

By employing payout lengths of shrinkable tubing in preferred apparatus arrangements herein taught, the tediousness of hand orientation of precut sections on a mandrel or in a tube section holder is obviated; and an improved order of accuracy, reliability, and speed is imparted to the operations.

The invention will further be described by reference to a drawing made a part hereof wherein:

FIG. 1 is a perspective view of an apparatus schematically showing the arrangement of various combinations and subcombinations of elements to which the invention is directed;

FIG. 2 is a plan front view of apparatus elements shown in FIG. 1;

FIG. 3 is a partially plan and partially sectional view, taken on line 3-3 of FIG. 2, with some elements omitted or broken away to permit clarity in the showing;

FIG. 4 is a schematic sectional view, taken on line 4-4 of FIG. 2 (with background elements omitted for clarity), showing the mandrel arrangement and actuating means for plunger movement of individual mandrels;

FIG. 5 is a rear plan view of the severing or cutting mechanism, taken as a section along line 5-5 of FIG. 3;

FIG. 6 is a schematic sectional view of feed box gears for feeding shrinkable tubing, taken on line 6-6 of FIG. 5;

FIG. 7 is a schematic sectional view of feed box rollers for feeding shrinkable tubing, taken on line 7-7 of FIG. 5;

FIG. 8 is a sectional view of the feed box, taken on line 8-8 of FIG. 6;

FIG. 9 is a schematic sectional view, taken on line 9-9 of FIG. 2, showing the feeding of shrinkable tubing upon a mandrel;

FIG. 10 is a sectional view of the die for changing flattened shrinkable tubing into a cylindrical shape, taken on line 10-10 of FIG. 9;

FIG. 11 is a sectional view of the die, taken on line 11-11 of FIG. 10;

FIG. 12 is a schematic sectional view, taken on line 12-12 of FIG. 2, illustrating mandrel transfer of a section of shrinkable tubing into a tube section holder;

FIG. 13 is a schematic sectional view, taken on 13-13 of FIG. 2, showing a magazine and selector feed mechanism for feeding objects to be inserted into sections of shrinkable tubing;

FIGS. 14 and 15 are sectional views taken on line 14-14 and 15-15, respectively, of FIG. 13;

FIGS. 16 and 17 are sectional views taken on lines 16-16 and 17-17, respectively, of FIG. 15;

FIG. 18 is a perspective view of a section of shrinkable tubing and a tube-encompassed object in the form of a capacitor having noncovered electrical leads extending therefrom; and FIG. 19 is a schematic showing of an indexing mechanism.

In FIGS. 1 and 2 of the drawing, the illustrative interrelationships of machine elements are schematically illustrated in front of a housing 10.

Centrally located in the views of FIGS. 1 and 2 is an assembly which is referred to as a holder assembly 11. It holds or carries a plurality of tube section holders 12 spaced at predetermined increments from each other. The tube section holders 12 are adapted to receive and hold unshrunken sections of shrinkable tubing in dislodgement-resistant condition.

This holder assembly 11 may be in the form of a rotatable disc or circular steel plate mounted for indexing rotation on a shaft 13. The tube section holders 12 may consist essentially of holes or bores through the disc 11 in the axial direction about the outer portion or peripheral area of the disc 11. The diameter of the holes or bores 12 will vary and is just sufficient to accommodate the outer diameter of unshrunken sections of shrinkable sleeve cylinder sections of tubing as chosen for an operation.

The holder assembly 11 is capable of being indexed, as hereinafter discussed, in predetermined increments to place the tube section holders in certain treatment stations during pauses or dwells between indexing motion. At each treatment station, operations are conducted in the method of forming tube-encompassed objects. The first treatment station 14 for tube section holders 12 is occupied by the tube section holder labeled 14 in FIGS. 1 and 2. While at least one tube section holder is simultaneously at a second treatment station labeled 15.

At the first treatment station 14, a section of shrinkable tubing (see illustrative enlarged tube section 16 in FIG. 18) is inserted into and simultaneously oriented in the tube section holder at that treatment station. This is suitably accomplished by a mandrel carried on a body assembly of mandrels.

Referring to FIGS. 1 through 4 inclusive, details of a preferred body assembly of mandrels will now be described. Illustratively, four mandrels 17, 18, 19, and 20 are carried on a mandrel body assembly 21 which is illustrated as a disc or circular plate 21. The body assembly 21 is mounted on shaft 22, which rotatably indexes the mandrel body assembly 21 in a manner synchronized with the indexing of holder assembly 11 carrying tube section holders 12. The indexing of the body assembly 21 is in a clockwise direction, as viewed in FIG. 2, with pauses between indexing being such as to place a mandrel, such as mandrel 17, in registry with a tube section holder at the first treatment station.

Each mandrel is equipped with elements which form a unit consisting of the mandrel pin proper (which is commonly termed the mandrel itself, e.g., mandrel 17), an integral pin mount member 23 (which also serves as a retract stop member) to which the mandrel pin proper is rigidly fixed, a mandrel pin shaft 24 to which the pin mount 23 is rigidly fixed, and a plunger abutment member 25 rigidly fixed to the heel of the mandrel pin shaft 24. Each mandrel pin shaft 24 is slidably mounted for longitudinal reciprocating motion in a sleeve bearing 26 fixed to body assembly 21. The mandrels are all biased in the retract condition, suitably by a coil spring 27 about the mandrel pin shaft 24 between the plunger abutment plate 25 (which is rigidly fixed to the heel of the mandrel pin shaft 24) and the sleeve bearing 26 (within which the mandrel pin shaft 24 is slidable).

At the same time that the mandrel numbered 17 is in registry with the tube section holder 14 at the first treatment station 14, the mandrel numbered 18 ( SEE FIGS. 3 and 4) is in registry with shrinkable tubing 28 exiting from die 29 (see FIGS. 3 and 9). The mandrels in these two respective positions during a pause in the indexing of the mandrel body assembly 21 are each subjected to a plunger-type action, or reciprocating action, by any suitable means. An illustrative arrangement of elements to effect this for the mandrel 18 (in registry with tubing 28 exiting from die 29) is schematically shown in FIG. 4 taken with the left part of FIG. 2. A rotating cam 30 of peripheral cylindrical configuration, except for a curved recess 31 in its otherwise cylindrical shape, it powered through a camshaft 32. Cam follower 33 is mounted on one arm 34 of a bellcrank lever 35 fulcrumed to pivot on shaft 36. As cam follower 33 (which is biased by any suitable means against cam 30) dips into recess of the cam 30, the lower arm 34 of bellcrank 35 moves toward the right (in the view illustrated in FIG. 2); and this in turn causes the upstanding arm 37 of the bellcrank 35 to be pulled to the left in FIG. 2. Simultaneously, link arm 38 is pulled in the direction illustrated by arrows in FIGS. 2 and 4, which in turn causes the follower arm 39 and actuating arm 40 of a further bellcrank fulcrumed on shaft 41 to move in a clockwise direction in FIG. 4. Clockwise movement of actuating arm 40 causes actuating link 42 to slide floating bar 43 toward the mandrel plunger abutment members 25. Sliding motion for floating bar 43 is guided by guide rod 44 fixed in housing wall 10. Simultaneously, plunger 45, fixed to floating bar 43, abuts against plunger abutment member 25 of mandrel pin 18 and pushes mandrel pin 18 (and pin mount member 23 and pin shaft 24) into a projecting condition. This projecting condition for mandrel pin 18 is illustrated in FIG. 9. After cam follower 33 leaves cam recess 31, all members return to the retract condition shown in FIG. 4. Mandrel 17 (not visible in the view taken for FIG. 4) is suitably simultaneously actuated by a further plunger fixed to an extension of floating bar 43.

Since mandrel 17 is in registry at the first treatment station 14 (see FIGS. 1, 3, and 12), a plunger action such as just described is effective to move mandrel 17 into cooperative relationship with tube section holder 14 to transfer a section of shrinkable tubing 16 from mandrel 17 to tube section holder 14. As shown in FIG. 12, the tube section 16 is carried about mandrel 17, with the mandrel pin 17 occupying the internal void of the tubing,; and the mandrel pin projects into the bore of the tube section holder.

Returning now to the holder assembly 11, illustrated in FIGS. 1 and 2, description will be made of the means by which objects are inserted into a tube section carried or held in the tube section holder located at the second treatment station 15.

FIGS. 13 through 17 inclusive, taken with FIGS. 1 and 2, illustrate a preferred arrangement of elements by which capacitors with extending leads are suitably inserted into a tube section in the tube section holder at the second treatment station 15. (An enlarged view of a capacitor 46 with electrical leads 47 and 48, and a tube section 49 shrunk over the capacitor body 46, is provided in FIG. 18.)

From a magazine or chute 50, the objects (for example, capacitors 46) are selected and carried in aced relationship by an indexing selector mechanism 51 to a feed plunger 52 which inserts them into a tube section at the second treatment station 15.

The magazine or chute suitably comprises spaced guide plates or rails 53, mounted on bar mounting posts 54, for one side of the objects 46, as well as spaced guide plates or rails 55 and 56 mounted on bar posts 57 for the other side of the objects 46. Objects 46 occupy the space between the guide rails and slide downwardly in that space, with electrical lead 47 extending out the slot between rails 53 and 55 (and electrical lead 48 extending out a comparable slot between a lower rail not visible in the drawing and rail 56).

At the lower terminus of the magazine 50 is the indexing selector mechanism 51 suitably consisting of a cylinder having spaced axially aligned troughs 58 disposed about the periphery thereof. Four such troughs are shown for the selector cylinder in the drawing. These troughs are of sufficient size to accommodate the object to be encompassed within a tube section; and as the selector cylinder 51 rotates by indexing beneath the magazine feed 50, the clearance factors are such that only a single object 46 is accommodated or selected by a trough 58 and transferred under selector guide arc finger 59 toward the second treatment station 15. Selector guide arc finger 59 (under which the objects are moved in the trough 58 by the indexing cylindrical selector mechanism 51 to the feed plunger 52) is mounted between guide rails 55 and 56 of the magazine feed 50, as illustrated in FIGS. 13 and 14.

Also to be observed (FIGS. 13 and 17) is the fact that the troughed selector cylinder 51 suitably is equipped with a plunger clearance extension 60 of cylindrical shape having a diameter essentially equal to the diameter between the valleys of troughs 58 of the troughed cylinder 51.

As objects are moved by the selector cylinder to the feed plunger (see FIGS. 15—17 inclusive), the electrical lead 48 extending from a capacitor 46 away from the leading electrical lead 47 is received within a longitudinal groove 61 (of more or less hemicylindrical or parabolic cross section) along the side of the plunger 52. Thus, the end of the plunger 52 acting to move the capacitor 46 into a shrinkable tube section 16 carried by a tube section holder at the second treatment station 15 serves to act directly upon the capacitor 46, as distinguished from acting upon the and pressing against a rearwardly projecting lead wire. By employing a longitudinal slot 61 along one side of the plunger 52 instead of a plunger with a centrally located opening for reception of an electrical lead, a shorter plunger stroke is permissible in the operation of transferring the capacitor 46 into tube section 16 carried by tube section holder 15. Plunger guide 62 is fixed at the end of the selector guide arc finger 59; and as illustrated in FIG. 17, plunger guide 62, in its portion over plunger clearance extension 60 off selector cylinder 51, is suitably provided with a backup brace 63 and forward brace 64. These brace parts aid in alignment of elements as objects are moved by indexing into position for plunger action. The backup brace 63 and forward brace 64 of plunger guide 62 also form a channel within which plunger 52 is guided in its reciprocating slide action for insertion of objects 46 in shrinkable tube section 16 at the second treatment station 15. As illustrated in FIG. 16, plunger guide 62, in its portion over trough 58, is also contoured to guide the head end of plunger 52 and assist in maintaining alignment of it for transit within trough 58 during the plunger motion. Plunger 52 is biased in its retract position as shown in FIGS. 13 and 15; and it is suitably given plunging motion by elements similar to, and synchronized with, the plunging motion for the mandrel 17 at the first treatment station 14.

Also to be noted is the fact that the straight leading electrical lead 47 is inserted entirely through a shrinkable tube section 16 on the way to emplacement of a capacitor 46 within the tube section 16 in a tube section holder at the second treatment station 15.

To prevent overshooting of the body of a capacitor 46 as it is moved by plunger 52 into tube section 16 in the tube section holder 15, a backstop member mounted in spaced condition from the troughed cylinder 51 serves as an abutment plate or backstop 65 to stop the motion of the body of the capacitor 46 and keep it within the tube section 16. The spaced mounting for backstop 65 provides clearance for holder assembly 11 between backstop 65 and selector cylinder 51. This backstop is illustrated as a disc member or plate of diameter essentially equal to the troughed selector cylinder 51. It is suitably mounted on the same drive shaft 66 as troughed cylinder 51, and indexes with the troughed selector cylinder 51. Both index in sychronization with the indexing of the holder assembly 11.

Frequently more important, backstop 65 prevents slippage of tube section 16 in holder 15 during insertion of a snug fitting object 46.

Minute grooves 67 in the periphery of backstop 65 are spaced to register with the troughs of the troughed selector cylinder. These grooves 67 permit the foremost lead wire 47 of the capacitor 46 to extend through them without being crimped or otherwise damaged during emplacement of the capacitor in a tube section.

Returning to FIGS. 1, 2, and 3, after the object 46 is placed in the oriented section of shrinkable tubing 16 at the second treatment station 15, further indexing of the holder assembly 11 moves the object 46 and the shrinkable tubing within a tube section holder toward means which shrink the object-containing sections of shrinkable tubing about the object therein. Suitably this may consist of a blast of warm or hot air from any suitable source 68. The hot air may be broken into two streams carried by conduits 69 and 70 to each side of the holder assembly at what may be called a third treatment station.

Thereafter, the object 46 as well as the section of tubing 49 encompassing it (note FIG. 18), is easily removed from the tube section holder; and this may be accomplished conveniently at a fourth treatment station by an eject plunger 71. The eject plunger may even act to push against an electrical lead 48 projecting from the tube-encompassed object at the fourth treatment station 72. Upon ejection by plunger 71, the tube-encompassed object falls downwardly striking collection chute 73, and is collected in any suitable manner as may be practical for the particular tube-encompassed object formed by using the teachings herein.

The arrangement of elements for a machine equipped to handle a payout length of shrinkable tubing will now be described.

FIGS. 5—11, taken with FIGS. 1, 2 and 3, show the elements to be discussed. A payout supply roll 74 of shrinkable tubing 75 is suitably mounted on a bracket member 76 fastened to the housing 10. Spring tensioning means 77 may be provided for adjustment of the tension under which flexible tubing 75 is drawn from the payout roll 74. In the usual case, the payout length is in flattened tapelike condition convoluted upon itself in the roll (and the numeral 75 is employed to designate the flattened tube); but nonflattened payout lengths of shrinkable tubing may be employed, if desired. From the payout roll 74, the leading end of tubing 75 is guided by a guide 78 (suitably an arced conduit or tube) to orient the direction of movement of the tubing 75 toward a feed box 79.

The feeding mechanism in the feed box is actuated by a plunger-actuated rod 80 (shown best in FIG. 1), which is preferably actuated in synchronization with the cam and cam follower actuation of mandrels numbered 17 and 18 in the drawing.

Plunger-actuated rod 80 moves only in a back and forth reciprocating motion; and this motion occurs at a pause in indexing of mandrel body assembly 21. On movement out from housing 10 illustrated in FIG. 1, rod 80 moves feed link arm 81 in a clockwise direction (as viewed looking at FIG. 1). Feed link arm 81 pivots on shaft 82 under cover housing 83 on feed box 79. On return of plunger-actuated rod 80, feed link arm 81 is moved in a counterclockwise direction.

Referring to FIG. 6, the clockwise movement of feed link arm 81 is accompanied by a clockwise motion for toothed master gear 84 fixed on shaft 82 about which feed link arm 81 pivots; but on the counterclockwise motion for feed link arm 81, a slip clutch at numeral 85 (of any suitable type) operates so that the toothed gear 84 is not rotated counterclockwise direction. (Alternately, elements such as feed link arm 81 and shaft 82 may be arranged in the manner of a rachet and pinion, so as to effect intermittent clockwise motion only for toothed gear 84.)

The intermittent (i.e., indexing) clockwise movement of toothed master gear 84 (see FIG 6) effects commensurate intermittent movement for connecting gears 86 and gears 87, 88, and 89, together with their respective shafts 90, 91 and 92 journaled in the feed box. The rotary direction of indexing for these gears is indicated by the arrows in FIG. 6. In turn, the feed rollers 93, 94, 95, and 96 (see FIG. 7), which are fixed on shafts 82, 90, 91 and 92, rotate by intermittent indexing motion in the direction indicated by the arrows in FIG. 7. The indexing motion of the coacting pairs of feed rollers 93, 94, 95 and 96 advances the lead end of the shrinkable tubing 75 toward the die 29 (see FIGS. 7 and 9), which at its entrance is at least of sufficient width or diameter (whether the entrance opening is oblong or circular) to receive or accommodate the lead end of flattened shrinkable tubing without restriction.

Die 29 gradually changes in contour—as, for example, illustrated in FIGS. 9—11, inclusive—into an approximately cylindrical exit bore 97 having a diameter less than the flattened width of the shrinkable tubing selected for use. Thus, as the flattened shrinkable tubing 75 proceeds through the die constriction 29, it is opened toward a cylindrical configuration or converted into a cylindrically shaped tube 28. As an assist for accomplishing this, it is preferred to employ die entrances 98 of oblong configuration, just sufficiently wide at the entrance to receive the flattened tubing without restriction. An oblong or flattened entrance 98 aids in obstructing rotary motion for the entering flattened tubing as it is converted to the cylindrical shape 28 in the die 29.

As the opened tubing exits from the die 29 (see FIG. 9), it is received upon a mandrel pin 18 which is in registry with the exiting opened tubing at a pause between indexing of the mandrel body assembly 21. The exit of the opened tubing from die 29 is met by simultaneous movement of mandrel pin 18 toward the exiting lead end tubing 28, as afore discussed.

Referring now to FIGS. 5 and 9, means to sever a section of shrinkable tubing from the feed end 28 thereof after the feed end 28 is on a mandrel 18 will now be described. A scissorslike action is provided by the leading edges of cutting blades 99 and 100. Cutting blades 99 and 100 are mounted for opposed reciprocating slidable movement in a plane next to a plate 101 mounted on the surface of the feed box from which the tubing 28 exits from the die 29. Guide rails 102 and 103 fixed to plate 101 guide the sliding motion of cutter 99; and guide rails 104 and 105 similarly fixed to plate 101 guide cutter 100. To each cutting blade 99 and 100 is fixed a bracket 106 and 107. Brackets 106 and 107 extend in opposite directions from respective cutting 99 and 100 to which they are fixed; and a togglelike action is employed to cause the brackets and therefore the cutting blades to move toward and away from each other to effect cutting of tubing 28 extending from the die 29. Specifically, a cutter link rod 108 is pivotally mounted to the outer extremity of cutter bracket 106; and cutter link rod 109 is pivotally mounted similarly to cutter bracket 107. The opposite ends of these cutters link rods 108 and 109 are pivotally mounted at pins 110 and 111 respectively to opposite ends of the cross member 112 of a T-shaped crank fulcrumed intermediate the ends of its cross member 112 on a fixed shaft 113 mounted on fixed plate 101. The actuating base leg 114 of the T-crank is pivotally connected at pin 115 to an actuating link bar 116 (shown in FIG. 1 as a pair of bars); and this actuating link bar 116 is in turn pivotally connected through pin 117 to the power arm 118 rigidly fixed at its opposite end upon power shaft 119. Power shaft 119 is actuated intermittently into a unitary oscillatory movement; and this is suitably accomplished by a cam linkage (not shown) analogous to the cam linkage for actuation of plungers as aforedescribed.

In operation, a counterclockwise motion (e.g. a rotation of 30°) of power shaft 119 as viewed in FIG. 5 (clockwise as viewed in FIGS. 1 and 2) moves power arm 118 in the direction indicated by the arrow in FIG. 5. This moves actuating link bar 116, the base leg 114 of the T-crank and the cutter link rods 108 and 109 in the direction indicated by arrows in FIG. 5. Simultaneously, the cutter blades 99 an are drawn together to sever the projecting section of tubing 28. On return of power shaft 119 to its position shown in FIG. 5, the clockwise motion is transmitted through the T-crank to the cutter blades 99 and 100 to open them or draw them apart to the position illustrated.

A single cycle of operation illustrating the synchronized interrelationship of the arrangement of elements in the machine is as follows:

A. First, indexing occurs; and in this step each of he following index and then pause or dwell after the indexing places operating elements in position as aforediscussed;
  1. The holder assembly 11.
  2. The mandrel body assembly 21.
  3. The selector cylinder 51.
B. Next, while the three indexing elements remain in a pause condition, the following occurs:
  1. During the initial phase of the pause:
    a. The shrinkable tubing 75 is fed through die 29 toward mandrel pin 18.
    b. Mandrel pin 18 is plunged forward to meet the shrinkable tubing exiting from die 29.
    c. Mandrel pin 17 (which picked up a section of shrinkable tubing 16 from die 29 at a previous pause in indexing) is by plunger action inserted into tube section holder at the first treatment station 14 of the holder assembly 11 and simultaneously carries with it (and orients the tube section holder) a section of shrinkable tubing 16.

d. Feed plunger 52 is actuated in insert an object into shrinkable tubing section 16 in the tub section holder at the second treatment station 15 of the holder assembly 11 e. Eject plunger 71 is actuated to eject a tube-encompassed object (e.g. capacitor 46 in shrunk section 49 as illustrated in FIG. 18) at the ejection station or fourth treatment station 72 of the holder assembly 11.

f. Shrinking treatment, as by a blast of hot air, is accomplished at this stage, or as preferred, is continuously accomplished without interruption of the hot airflow from conduits 69 and 70 at what might be termed a third treatment station for tube section holders of holder assembly 11.

2. During the middle phase of the pause, all systems (other than the hot airflow) dwell or pause except the following: 2.

a. The cutters 99 and 100 move together to sever a section of shrinkable tubing fed upon mandrel pin 18 during the initial phase of the pause or dwell in indexing.

b. Optionally, further motion of the elements listed as (C) through (e) inclusive, under subparagraph 1 of paragraph B may occur, either toward or away from the holder assembly 11.

3. During the terminal phase of the pause, the following occurs:

a. Cutters 99 and 100 move apart.

b. Mandrel pin 18 retracts, carrying with it a severed section of shrinkable tubing.

c. Elements listed as (c) through (e) under subparagraph 1 of paragraph B return to full retract positions. (If these elements were returned during the middle phase of the pause, the terminal part of the pause between indexing of the elements set forth under paragraph A may be accompanied by some initial indexing motion for the holder assembly 11 and selector cylinder 51 for the start of a new cycle.)

The foregoing cycle is repeated ad infinitum to form tube-encompassed objects in a rapid reliable and efficient manner.

Indexing of the holder assembly 11, mandrel body assembly 21, and selector cylinder 51 may be accomplished by any suitably known means. One such means is illustrated in FIG. 19; and consists of a multirecessed cam 120 (having shallow dwell recesses 121 and deep indexing recesses 122) fixed upon a rotatable shaft 123, and a main motive power shaft 124 carrying a concentric disc or alignment plate 125 with concentric dwell lock cam 126 (outlined by dash lines) plus an eccentrically mounted rotatable indexing cam follower 127. As main power shaft 124 rotates in the direction shown by the arrow in FIG. 19 eccentrically mounted indexing cam follower 127 moves into the adjacent indexing recess 128 of cam 120. Simultaneously, concentric swell lock cam 126 (because of its configuration) is released or moved out of contact with dwell recess 129. The movement of indexing cam follower 127 into and out of indexing recess 128 causes a unitary indexing or rotating shift of cam 120 and shaft 123 in the direction shown by the arrow; then dwell lock cam 126 moves into and is received by dwell recess 130. A gear 131 on shaft 123 is suitably used to transmit the indexing dwell motion to follower shafts (such as shaft 132) through cooperating gears (such as gear 133) or other suitable linkage. Indexing elements such as the holder assembly may be mounted directly upon either the shaft 123 for cam 120 or upon a follower shaft 132.

That which we claim is:

1. A machine for affixing sections of shrinkable tubing about objects comprising, in combination, 1. a holder assembly of tube section holders spaced from each other, each of said tube section holders comprising means defining an open ended tubular bore for receiving a section of shrinkable tubing in snugly fitting condition therein, and oriented for reception of an object, 2. means to index said holder assembly in predetermined increments to place at least one of the space tube section holders thereof at a first treatment station and simultaneously place at least one other spaced tube section holder of said assembly at a second treatment station and to maintain said tube section holders at the treatment stations during an indexing pause, 3. means to orient a section of said shrinkable tubing in a tube section holder of said holder assembly at sad first treatment station during said indexing pause, 4. means to place an object in a oriented section of said shrinkable tubing at said second treatment station during said indexing pause, and 5. means for applying heat to an object-containing section of shrinkable tubing in said holder assembly sufficient to shrink said section of tubing about the object therein and to relieve said snug fit between said section of shrinkable tubing and said cylindrical bore in said holder assembly.

2. The machine of claim 1, wherein the means for applying heat to an object-containing section of shrinkable tubing operates subsequent to the second treatment station in the indexing of said assembly and comprises a third treatment station, and wherein said means to index said holder assembly will maintain at least one other tube section holder at said third treatment station during said indexing pause.

3. the machine of claim 1, comprising additionally, means for selection and orientation of an object preparatory to placing it in an oriented section of shrinkable tubing at said second treatment station.

4. The machine of claim 1, having ejection means acting subsequent to said means to affix object-containing sections of shrinkable tubing about objects therein in the indexing of said assembly, said ejection means being operable to eject tube-section-encompassed objects from tube section holders prior to indexing of tube section holders into the first treatment station.

5. The machine of claim 1, wherein the means to orient a section of said shrinkable tubing in a tube section holder at said first treatment station comprises a mandrel adapted to move into cooperative relationship with the tube section holder to transfer a section of shrinkable tubing from said mandrel to said tube section holder.

6. The machine of claim 5, comprising additionally:

1. means apart from said first treatment station to feed one end of a payout length of shrinkable tubing to said mandrel, and 2. means apart from said first treatment station to cut sections of shrinkable tubing from said payout length.

7. The machine of claim 6, comprising additionally:

1. means to mount a payout length of flexible shrinkable tubing in flattened tape condition convoluted upon itself in a roll as a supply roll in position for feeding one end thereof to said mandrel, and 2. means to open said one end of said flattened flexible shrinkable tubing toward a sleeve cylinder shape as it is fed upon said mandrel.

8. The machine of claim 7, wherein the means to feed one end of the payout length of flattened shrinkable tubing to said mandrel consists essentially of gripping feed rollers acting upon opposite flattened surfaces of the length of shrinkable tubing, and wherein the means of open said one end of said flattened tubing includes a die through which said one end of shrinkable tubing fed by said feed rollers is forced within a distance of about 5 centimeters from the immediately preceding feed rollers, said die being oblong at its entrance and adapted to receive said flattened flexible tubing without restriction and gradually changing in contour to provide an approximately cylindrical exit constriction having a diameter less than the flattened width of the shrinkable tubing, whereby the tubing exiting from the die is opened toward a cylindrical configuration.

9. The machine of claim 6, wherein the mandrel is characterized by having a blunt but sufficiently pointed tip for insertion into a partially opened end of flattened shrinkable tubing and reception of said tubing thereabout.

UNITED STATES PATENT OFFICE
CERTIFICATE OF CORRECTION

Patent No. 3,591,890                    Dated July 13, 1971

Inventor(s) Arnold P. Le Vasseur and Randolph P. Roen

It is certified that error appears in the above-identified patent and that said Letters Patent are hereby corrected as shown below:

Note that the line numbers in the patent do not align with the lines in columns 1 through 10, and that the line numbers were determined by counting lines.

Column 1, line 37, after "5", "75" and "80" insert -- % --;

Column 4, line 12, after "stations" insert -- and to maintain the tube station holders at the treatment stations --; line 15, change "The" to -- A --; line 18, after "is" insert -- in the first treatment station 14, at least one other tube section holder is --; line 36 after "station." insert -- while the position of the mandrels 17, 18, 19 and 20 change during indexing of the body assembly 21, the following description is written with reference to mandrels positioned as shown in the drawing: --; line 64, after "shape," change "it" to -- is --; line 68, after "recess" insert -- 31 --;

Column 5, line 24, after "holder" insert -- 14 carrying the tube section 16 with it. As mandrel pin 17 retracts, tube section 16 is left in the tube-section-holder. --; line 37, change "aced" to -- spaced --;

Column 6, line 6, delete "the"; line 71, after "station", insert -- 72 --;

Column 7, line 40, after "rotated" insert -- in a --; line 47, change "gears" (first occurrence) to -- gear --;

Column 8, line 2, change "a" to -- the --; line 6, after "end" insert -- of --; line 9, after "scissorlike" insert -- cutting --; line 17 change "and" (second occurrence) to -- or -- cont'd.

FORM PO-1050 (10-69)

UNITED STATES PATENT OFFICE
CERTIFICATE OF CORRECTION

Page -2-

Patent No. 3,591,890         Dated July 13, 1971

Inventor(s) Arnold P. Le Vasseur and Randolph P. Roen

It is certified that error appears in the above-identified patent and that said Letters Patent are hereby corrected as shown below:

; line 18, after "from" insert -- the --; line 19, after "cutting", insert -- blades --; line 30, change "The" to -- An --; line 45, after "99" delete "an" and insert -- and 100 --; line 54, change "he" to -- the --; line 56, change "position" to -- positions --; line 72, after "orients" insert -- in --;

Column 9, line 1, change "in" to -- to --; line 2, change "tub" to -- tube --; line 18, delete "2."; line 24, change "(C)" to -- (c) --; line 54, change "swell" to -- dwell --;

In The Claims

Column 9, line 73, after "therein" delete ", and oriented", and insert -- and orienting said section --;

Column 10, line 1, change "space" to -- spaced --; line 10, after "in" change "a" to -- an --; line 30, delete "to affix" and insert -- for applying heat to an --; and change "sections" to -- section --; lines 31 and 32, change "about objects therein in the indexing of said assembly, said ejection means being operable to eject" to -- for ejecting --; line 34 after "from", insert -- said --, after "holders" delete "prior"; lines 34 and 35, delete "to indexing of tube section holders into the first treatment station"; line 60, change "of" (first occurrence) to -- to --.

Signed and sealed this 18th day of April 1972.

(SEAL)
Attest:

EDWARD M. FLETCHER, JR.
Attesting Officer

ROBERT GOTTSCHALK
Commissioner of Patents